July 16, 1968 JAMES E. WEBB 3,393,380
ADMINISTRATOR OF THE NATIONAL AERONAUTICS AND SPACE ADMINISTRATION
PHASE LOCKED PHASE MODULATOR INCLUDING A VOLTAGE CONTROLLED OSCILLATOR
Filed March 15, 1966
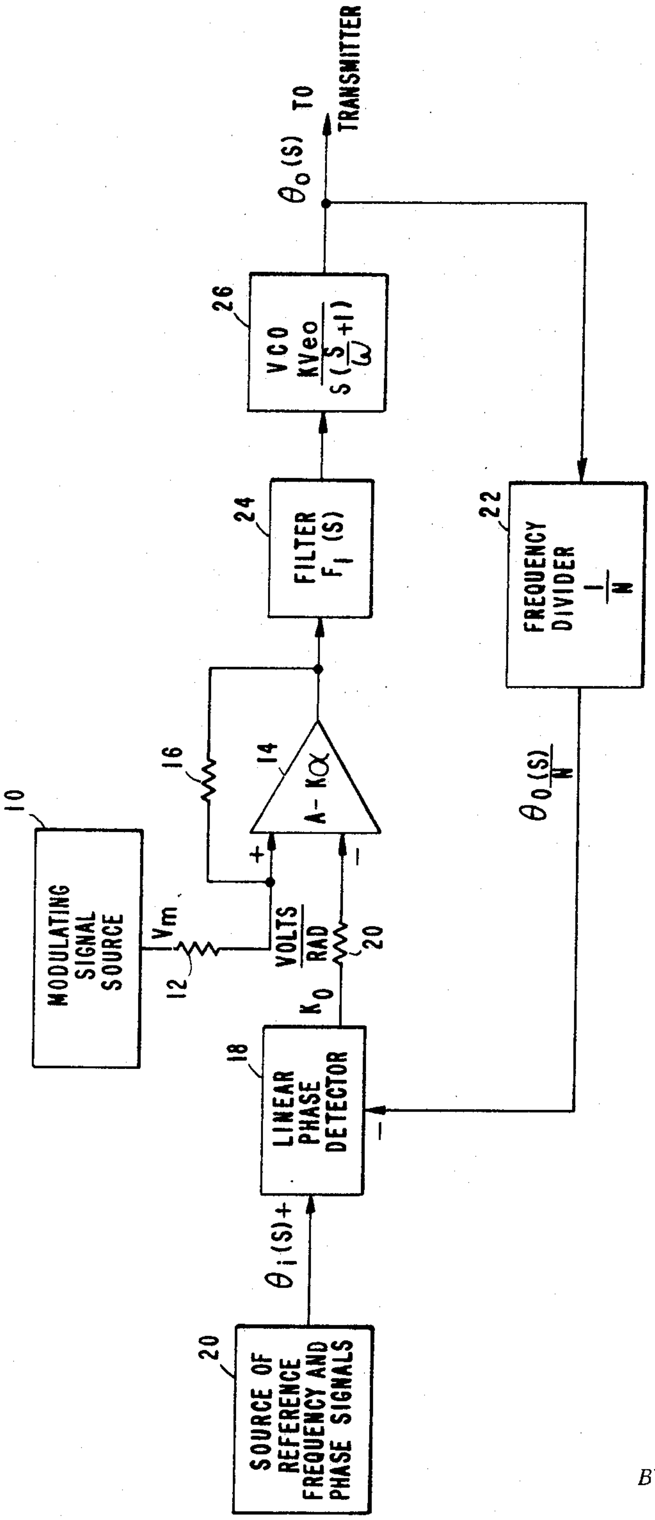
INVENTORS
GEORGE R. VAUGHAN
JAMES B. SIVLEY
BY D C Leslie
G T McCoy
ATTORNEY United States Patent Office 3,393,380
Patented July 16, 1968

3,393,380
PHASE LOCKED PHASE MODULATOR INCLUDING A VOLTAGE CONTROLLED OSCILLATOR

James E. Webb, Administrator of the National Aeronautics and Space Administration, with respect to an invention of George R. Vaughan, Linthicum, and James B. Sivley, Laurel, Md.
Filed Mar. 15, 1966, Ser. No. 536,217
5 Claims. (Cl. 332—19)

*Origin of the invention*

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to phase modulator systems, and more particularly to improvements therein.

With the advent of space communications, there has come an increased utilization of communication techniques employing phase modulated carriers and phase coherent receivers. The reason for the popularity is because with presently known techniques of coherent phase detection, successful communication is obtainable over interplanetary distances with minute quantities of transmitted power.

The earliest phase modulators included a reactance tube arranged so that the reactance formed a portion of the total circuit impedance. It was well known that the reactance tube output reacted as a function of the drive voltage. Therefore, the phase response of the reactance tube circuit was a function of the drive or modulating voltage. As voltage sensitive capacitors (varactor diodes) became available, the reactance tube was gradually replaced with this. However, both devices yield an output carrier whose phase is a function of the modulating voltage. Unfortunately, the phase response of these systems is quite nonlinear for other small phase deviations. The usual acceptable linear phase deviation of either the reactance tube or varactor is plus or minus 0.1 radians. Since the ranging system of current space communication systems demands phase deviations up to plus or minus 4 radians, in order to increase the phase deviation obtained, a phase modulator typically is followed by frequency multipliers with multiplication factors that bridge the gap between the modulator capabilities and the final required deviation.

Such a system is not without problems. The information transmitted is carried in the phase of the carrier. Therefore, the phase linearity of all subsequent multipliers, amplifiers and mixers is paramount. Further, a meaningful analysis of the final phase linearity and group delay of this system, as a function of the individual cascaded nonlinearity is an impossible task. The usual procedure is to build all components as linear as possible and to hope for the best.

An object of this invention is to provide a phase modulating arrangement which provides a linear phase deviation over a much larger range than presently available systems.

Another object of the present invention is to provide an improved phase modulator system which provides the required phase deviation without using multipliers, amplifiers and mixers to the extent employed in presently known phase modulators.

Yet another object of this invention is the provision of a novel and useful phase modulation system.

These and other objects of the invention may be achieved in a system wherein a reference frequency is provided. This is applied to a linear phase detector to which there is also applied the divided down output of the phase modulator carrier. Any difference in phase between this divided down phase modulated carrier (which is divided down to the frequency of the reference frequency) and the reference frequency is combined with the incoming modulating signal. The result obtained by the addition of these two signals is applied through a low pass filter to a voltage controlled oscillator. The output of the voltage controlled oscillator comprises a carrier having the phase information thereon. This is both transmitted and applied to the frequency divider to be divided down and thereafter applied to the linear phase detector.

The novel features that are considered characteristic of this invention are set forth with particularity in the appended claims. The invention itself both as to its organization and method of operation, as well as additional objects and advantages thereof, will best be understood from the following description, when read in connection with the accompanying drawing, which is a block schematic diagram of an embodiment of this invention.

Referring now to the drawing, it is desired to transmit by phase modulation, the information in a modulating signal, $V_m$ derived from a modulating signal source 10. These are applied through a first resistor 12 as one input to an inverting amplifier 14. The amplifier has a feedback resistor 16 connected between its output and its input. A second input to the amplifier is the output of a linear phase detector 18. This is applied through a third resistor 20 to the amplifier input to be added to the input received from the modulating signal source.

The linear phase detector 18 may be any one of the well known circuits which are capable of providing a voltage output which varies linearly with the phase difference of its two inputs. This may be for example a flip-flop circuit wherein one input drives the flip-flop to its set state and the other input drives the flip-flop to its reset state. Both outputs of the flip-flop circuit are applied to a low pass filter 24. The output of the low pass filter is a signal which has an amplitude dependent upon the phase relationship of its two inputs. One of the two inputs to the linear phase detector comprises the output signals from a source of reference frequency signals 20. The other input to the linear phase detector is derived from a frequency divider 22.

The output of the amplifier consisting of the amplified sum of its two inputs, is applied to a low pass filter 24. The low pass filter should be one which is capable of passing the highest frequency of the modulating signal received from the source 10. The output of the low pass filter is applied to a voltage controlled oscillator 26. The voltage controlled oscillator may be any of the well known VCO circuits wherein the frequency of its output may be varied in well known manner in response to the voltage applied to its input. The output of the voltage controlled oscillator is transmitted and is also fed back to the frequency divider to be divided down by an amount N. Since phase deviation information may be derived from frequency shift information, the output of the voltage controlled oscillator 26 therefore is phase modulated with the modulating voltage $V_m$ which may be detected using any of the well known phase detection receivers.

In order to understand the operation of the invention, assume at the outset that no modulating signal $V_m$ is being applied from the modulating signal source 10. The output of the voltage controlled oscillator 26 provides an output at some frequency, assume for illustration, that this is 50 megacycles. The frequency divider will divide this by N, which will be assumed to be 4. The 12½ megacycle output of the frequency divider is applied to the linear phase detector. Assume that the source of reference frequency and phase signals provides an output consisting of a 12.5 mc. signal having a constant phase and frequency. If the output of the VCO is equal in frequency and phase to the output of the source 20, then no correcting signal is generated at the output of the linear phase detector. However, if for some cause there is a deviation in the output of the VCO from the output of the source 20, the linear phase detector will provide an output signal having an amplitude representative thereof. With no modulating signal being applied, the output of the linear phase detector is applied to alter the VCO output to change its frequency in a manner to reduce the linear phase detector output to zero. Thus, the output of the linear phase detector alone can change the frequency of the VCO to compensate for deviations from the frequency and phase of the source of reference frequency and phase signals.

Considering now a modulating signal $V_m$ being present and the output of the linear phase detector, as an error correcting signal, then this error correcting signal is combined with the modulating signal $V_m$ to produce a resultant signal which varies the frequency of the VCO by an amount required to both correct for frequency and phase deviation as related to the reference source 20 and also to represent the modulating signal.

Included in the drawing are notations indicative of loop scale factors and transfer functions expressed in Laplace notation. Thus expressing the transfer of output phase as a function of the baseband modulation, the following equation may be derived using the standard servo-loop relationships:

$$\frac{\theta_o(s)}{V_m}=\frac{N}{K_d}\cdot\frac{1}{\frac{S}{K_v}\cdot\frac{(s/w_1+1)}{F_1(s)}+1} \qquad (1)$$

where $$K_v=\frac{1}{N}K_a,\ K_d,\ K_{VCO}$$

It will be seen from the drawing that $K_d$, $K_a$ and $K_{VCO}$ are all respectively constants of the linear phase detector, the amplifier, and the voltage controlled oscillator. N is the division factor of the divider.

The equation indicates that the output phase $\theta_o(s)$ is a linear function of the baseband modulation voltage $V_m$ if $$s/K_v\cdot\frac{s/w_1+1}{F_1(s)}\gg 1$$

at least over the frequency range of the baseband modulation voltage $V_m$.

In an actual embodiment of the invention which was constructed and successfully operated, where the reference frequency employed was 12.5 megacycles and the "no modulating voltage" output of the VCO was 50 megacycles, with the modulating voltage comprising the amplitude modulation of a 1.5 megacycle signal, with N equal to 4, a linear phase deviation at the carrier frequency of 50 megacycles was obtained which was on the order of plus or minus 4 radians. This is a wider linear phase deviation than has been obtainable from presently known devices.

The receiver for detecting a transmission generated by apparatus of this invention may be a standard phase detector receiver.

There has accordingly been described and shown herein a novel, useful and unique apparatus for the phase modulation of a signal on a carrier.

What is claimed is:

1. A phase locked phase modulator comprising voltage controlled oscillator means for producing output signals whose frequency is determined by the voltage of an input signal applied thereto, means for generating reference signals having a stable phase and frequency, means for comparing the phase of said output signals with said reference signals to produce error signals representative of the difference of these, a source of modulating signals, means for combining said error signals with modulating signals from said source, and means applying said combined signals to said voltage controlled oscillator for controlling the frequency of the output signals of said voltage controlled oscillator means.

2. Apparatus as recited in claim 1 wherein the frequency of signals generated by said means for generating reference signals is $1/N$ times the frequency of said output signals of said voltage controlled oscillator means in the absence of an input signal applied thereto and there is included means for dividing the frequency of said output signals by an amount $1/N$ connected between the output of said voltage controlled oscillator means and said means for comparing the phase of said output signals and said reference signals.

3. Apparatus as recited in claim 1 wherein said means for comparing the phase of said reference frequency signals and said output signals comprises a linear phase detector.

4. A system for phase modulating a carrier with modulating signals from a source of modulating signals comprising a source of reference signals having a fixed frequency and phase, voltage controlled oscillator means for producing output signals at a frequency determined by input voltage control signals, the frequency of said output signals in the absence of input voltage control signals being N times higher than the frequency of said reference signals, frequency divider means for dividing the frequency of said output signals of said voltage controlled oscillator by N, phase detecting means for detecting the difference in phase between said output signals and the output of said frequency divider and producing an error signal representative thereof, means for combining said error signal with modulating signals from said source of signals, and means for applying the output of said means for combining as input voltage control signals to said voltage controlled oscillator means.

5. A system as recited in claim 4 wherein said means for applying the output of said means for combining as input voltage control signals to said voltage controlled oscillator means includes low pass filter means for passing signals up to the frequency of said modulating signals.

References Cited

UNITED STATES PATENTS

| | | | |
|---|---|---|---|
| 2,662,214 | 12/1953 | Hugenholtz | 332—19 |
| 3,046,496 | 7/1962 | Trevor | 332—19 |
| 3,118,117 | 1/1964 | King et al. | 332—22 |
| 3,142,806 | 7/1964 | Fernandez | 332—19 X |
| 3,277,390 | 10/1966 | McLin | 331—25 |

ALFRED L. BRODY, *Primary Examiner.*